United States Patent
Sun et al.

(10) Patent No.: US 10,858,492 B2
(45) Date of Patent: Dec. 8, 2020

(54) NUCLEATING AGENT FOR FOAMABLE CABLE INSULATION

(71) Applicant: Dow Global Technologies LLC, Midland, MI (US)

(72) Inventors: Gangwei Sun, Shanghai (CN); Mohamed Esseghir, Collegeville, PA (US); Yonghua Gong, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 84 days.

(21) Appl. No.: 16/332,279

(22) PCT Filed: Sep. 13, 2016

(86) PCT No.: PCT/CN2016/098811
§ 371 (c)(1),
(2) Date: Mar. 11, 2019

(87) PCT Pub. No.: WO2018/049555
PCT Pub. Date: Mar. 22, 2018

(65) Prior Publication Data
US 2019/0203011 A1   Jul. 4, 2019

(51) Int. Cl.
| | | |
|---|---|---|
| *C08J 9/32* | (2006.01) | |
| *C08L 23/06* | (2006.01) | |
| *C08L 27/18* | (2006.01) | |
| *C08J 9/00* | (2006.01) | |
| *H01B 3/44* | (2006.01) | |
| *C08J 9/12* | (2006.01) | |

(52) U.S. Cl.
CPC .............. *C08J 9/32* (2013.01); *C08J 9/0061* (2013.01); *C08L 23/06* (2013.01); *C08L 27/18* (2013.01); *H01B 3/441* (2013.01); *H01B 3/445* (2013.01); *C08J 9/122* (2013.01); *C08J 2201/03* (2013.01); *C08J 2203/06* (2013.01); *C08J 2203/14* (2013.01); *C08J 2203/22* (2013.01); *C08J 2323/06* (2013.01); *C08J 2423/06* (2013.01); *C08J 2427/18* (2013.01); *C08L 2203/202* (2013.01); *C08L 2205/025* (2013.01); *C08L 2205/03* (2013.01); *C08L 2205/24* (2013.01); *C08L 2207/062* (2013.01); *C08L 2207/066* (2013.01); *C08L 2310/00* (2013.01)

(58) Field of Classification Search
CPC ... B29C 48/0012; B29C 48/022; B29C 48/15; C08J 3/226; C08J 9/0061; C08J 9/32; C08J 2201/03; C08J 2203/06; C08J 2203/14; C08J 2203/22; C08J 2323/06; C08J 2423/06; C08J 2427/18; C08J 9/122; C08L 23/06; C08L 27/18; C08L 2203/202; C08L 2205/025; C08L 2205/03; C08L 2205/24; C08L 2207/062; C08L 2207/066; C08L 2310/00; H01B 3/441; H01B 3/445
See application file for complete search history.

(56) References Cited

U.S. PATENT DOCUMENTS

| | | |
|---|---|---|
| 3,615,972 A | 10/1971 | Morehouse et al. |
| 5,272,236 A | 12/1993 | Lai et al. |
| 5,278,272 A | 1/1994 | Lai et al. |
| 5,986,028 A | 11/1999 | Lai et al. |
| 6,127,441 A | 10/2000 | Sakamoto et al. |
| 6,284,810 B1 | 9/2001 | Burnham et al. |
| 7,355,089 B2 | 4/2008 | Chang et al. |
| 7,767,725 B2 | 8/2010 | Brix et al. |
| 2009/0068429 A1 | 3/2009 | Kmiec et al. |
| 2010/0196641 A1 | 8/2010 | De Vos et al. |
| 2015/0307679 A1* | 10/2015 | Lee .................. C08J 9/14 521/79 |
| 2017/0009040 A1* | 1/2017 | Kurup ............. B29C 35/0805 |
| 2017/0267828 A1* | 9/2017 | Sun ..................... C08J 9/228 |

FOREIGN PATENT DOCUMENTS

| | | |
|---|---|---|
| CA | 2155328 A1 | 9/1994 |
| CA | 2523861 C | 2/2011 |
| CN | 102428128 A | 4/2012 |
| CN | 103012918 A | 4/2013 |
| DE | 19940604 A1 | 3/2000 |
| EP | 1269484 B1 | 11/2006 |
| EP | 2164893 B1 | 6/2013 |
| JP | 2001031792 A | 2/2001 |
| WO | 2006/094163 A1 | 9/2006 |
| WO | 2016/082210 A1 | 6/2016 |
| WO | 2016/082211 A1 | 6/2016 |

\* cited by examiner

*Primary Examiner* — Irina S Zemel

(57) ABSTRACT

A foamable composition comprises in weight percent based on the weight of the composition: (A) 45 to 95 wt % HDPE, (B) 4 to 54 wt % LDPE, and (C) 0.01 to 2 wt % of a nucleating agent comprising in weight percent based on the weight of the nucleating agent: (1) 20 to 80 wt % of fluororesin, e.g., PTFE, and (2) 80 to 20 wt % of expandable polymeric microspheres.

15 Claims, No Drawings

NUCLEATING AGENT FOR FOAMABLE CABLE INSULATION

FIELD OF THE INVENTION

This invention relates to cable insulation. In one aspect, the invention relates to cable insulation for high frequency coaxial cables while in another aspect, the invention relates to nucleating agents for foamable polyethylene compositions.

BACKGROUND OF THE INVENTION

Typically, the insulation layer of a high frequency telecom cable is produced from a mixture of (A) a high density polyethylene (HDPE), (B) a low density polyethylene (LDPE), and (C) a nucleating agent, the mixture foamed by using a gas injection extrusion process. In the foaming process, the blowing agent, such as nitrogen or carbon dioxide ($CO_2$), is injected under pressure directly into the polyethylene (PE) melt mixture so as to dissolve within the melt and to form a homogenous mixture with the melt. This homogeneous mixture is kept under pressure (the amount of which is determined by the gas used and the melt pressure), and this pressure is maintained throughout to the extruder in order to prevent the gas from expanding the melt prematurely. On exiting the die, the melt pressure decreases to atmospheric pressure and the dissolved gas expands immediately in the melt to form the foam insulation coated on the conductor, e.g., copper wire.

Insulation with a higher expansion ratio, a finer cell size, and a more uniform cell distribution are always pursued to meet the high transmission efficiency in telecom cable. Adding a nucleating agent is an effective technique used to reduce the cell size, enhances the cell population and promote a uniform cell distribution. Azodicarbonamide (ADCA) and 4,4'-oxybisbenzenesulfonylhydrazide (OBSH), which can thermally decompose in an extruder and form a number of fine nuclei in the polymer melt, have been used as active nucleating agents for telecom cable insulation. However, the decomposition by-products of ADCA and OBSH are polar which negatively affect the electrical performance the polymer.

Comparatively, fluororesin powder, such as polytetrafluoroethylene (PTFE), which is typically used as a passive nucleating agent, has superior electrical properties and heat resistance, and it is free of the decomposition issues associated with ADCA. PTFE used as a nucleating agent for the telecom cable foaming insulation has been proposed and widely used. However, desirably finer and more uniform cell structure is difficult to obtain when using PTFE as a nucleating agent.

Foamable polyolefin compositions are described in various publications including CA 2 155 328 A1; EP 1 269 484 B1; EP 2 164 893 B1; U.S. Pat. No. 6,127,441; JP 04879613 B2; U.S. Pat. No. 7,767,725; and JP 03534666 B2.

SUMMARY OF THE INVENTION

In one embodiment the invention is a composition comprising in weight percent based on the weight of the composition:
(A) 45 to 95 wt % HDPE,
(B) 4 to 54 wt % LDPE, and
(C) 0.01 to 2 wt % of a nucleating agent comprising in weight percent based on the weight of the nucleating agent:
  (1) 20 to 80 wt % of a fluororesin, and
  (2) 80 to 20 wt % of expandable polymeric microspheres.

In one embodiment the composition further comprises one or more of an antioxidant and a cell stabilizer.

In one embodiment the invention is a masterbatch comprising in weight percent based on the weight of the masterbatch:
(A') 50 to 95 wt % of at least one of HDPE and LDPE, and
(C) 5 to 50 wt % of a nucleating agent comprising in weight percent based on the weight of the nucleating agent:
  (1) 20 to 80 wt % of a fluororesin, and
  (2) 80 to 20 wt % of expandable polymeric microspheres.

In one embodiment the invention is a process of coating a wire or cable with a foamable polyethylene composition, the process comprising the steps of:
(1) preparing in an extrusion zone a melt blend of (a) HDPE, (b) LDPE, and (c) a nucleating agent comprising in weight percent based on the weight of the nucleating agent:
  (i) 20 to 80 wt % of a fluororesin, and
  (ii) 80 to 20 wt % of expandable polymeric microspheres, and
(2) extruding the mixture of (1) under extrusion conditions onto a wire or cable.

In one embodiment the foamable composition further comprises one or more of an antioxidant and a cell stabilizer.

DETAILED DESCRIPTION OF THE PREFERRED EMBODIMENT

Definitions

For purposes of United States patent practice, the contents of any referenced patent, patent application or publication are incorporated by reference in their entirety (or its equivalent U.S. version is so incorporated by reference) especially with respect to the disclosure of definitions (to the extent not inconsistent with any definitions specifically provided in this disclosure) and general knowledge in the art.

Any reference to the Periodic Table of Elements is that as published by CRC Press, Inc., 1990-1991. Reference to a group of elements in this table is by the new notation for numbering groups.

The numerical ranges disclosed herein include all values from, and including, the lower and upper value. For ranged containing explicit values (e.g., 1 or 2; or 3 to 5; or 6; or 7), any subrange between any two explicit values is included (e.g., 1 to 2; 2 to 6; 5 to 7; 3 to 7; 5 to 6; etc.).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

Unless stated to the contrary, implicit from the context, or customary in the art, all parts and percents are based on weight and all test methods are current as of the filing date of this disclosure.

"Nucleator", "nucleating agent" and like terms mean, in the context of this invention, a substance, typically a small particle, that provides a nucleation site or location for bubble formation within a polymer melt. Nucleating agents are used to enhance the cell structure of foamed polymers.

"Masterbatch" and like terms mean a concentrated mixture of additives in a carrier resin. In the context of this invention, a masterbatch comprises a concentrated mixture of fluororesin nucleator in a polyolefin resin. The masterbatch allows for an efficient addition and dispersion of the nucleator to and in the polyolefin. The manufacture and use of masterbatches are well known to those skilled in the art of manufacturing and fabricating plastics and foam articles.

"Foamable" and like terms mean, in the context of this invention, that a polyolefin composition comprising a blend of HDPE and LDPE can be expanded into a cellular structure.

High Density Polyethylene (HDPE)

A "high density polyethylene" (or "HDPE") is an ethylene-based polymer having a density of at least 0.94 g/cc, or from at least 0.94 g/cc to 0.98 g/cc. The HDPE has a melt index from 0.1 g/10 min to 25 g/10 min.

The HDPE can include ethylene and one or more $C_3$-$C_{20}$ α-olefin comonomers. The comonomer(s) can be linear or branched. Nonlimiting examples of suitable comonomers include propylene, 1-butene, 1 pentene, 4-methyl-1-pentene, 1-hexene, and 1-octene. The HDPE can be prepared with either Ziegler-Natta, chromium-based, constrained geometry or metallocene catalysts in slurry reactors, gas phase reactors or solution reactors. The ethylene/$C_3$-$C_{20}$ α-olefin comonomer includes at least 50 percent by weight ethylene polymerized therein, or at least 70 percent by weight, or at least 80 percent by weight, or at least 85 percent by weight, or at least 90 weight percent, or at least 95 percent by weight ethylene in polymerized form.

In an embodiment, the HDPE is an ethylene/α-olefin copolymer with a density from 0.95 g/cc to 0.98 g/cc, and a melt index from 0.1 g/10 min to 10 g/10 min. In an embodiment, the HDPE has a density from 0.960 g/cc to 0.980 g/cc, and a melt index from 0.1 g/10 min to 10 g/10 min.

In an embodiment, the HDPE has a density from 0.95 g/cc, or 0.96 g/cc to 0.97 g/cc and a melt index from 0.1 g/10 min to 10 g/min.

In an embodiment, the HDPE has a density from 0.96 g/cc to 0.98 g/cc and a melt index from 1.0 g/10 min to 10.0 g/10 min.

Nonlimiting examples of suitable HDPE include ELITE 5960G, HDPE KT 10000 UE, HDPE KS 10100 UE, HDPE 35057E, and AXELERON™ CX-A-6944 NT, each available from The Dow Chemical Company Midland, Mich., USA; and SURPASS® available from Nova Chemicals Corporation, Calgary, Alberta, Canada.

When the HDPE employed is a bimodal HDPE, such HDPE can comprise a first polymeric component and a second polymeric component. In various embodiments, the first component can be an ethylene-based polymer; for example, the first component can be a high-molecular-weight ethylene homopolymer or ethylene/alpha-olefin copolymer. The first component may comprise any amount of one or more alpha-olefin copolymers. For example, the first component can comprise less than 10 wt % of one or more alpha-olefin comonomers, based on the total first component weight. The first component may comprise any amount of ethylene; for example, the first component can comprise at least 90 wt % of ethylene, or at least 95 wt % of ethylene, based on the total first component weight.

The alpha-olefin comonomers present in the first component of the bimodal HDPE typically have no more than 20 carbon atoms. For example, the alpha-olefin comonomers may have from 3 to 10 carbon atoms, or from 3 to 8 carbon atoms. Exemplary alpha-olefin comonomers include, but are not limited to, propylene, 1-butene, 1-pentene, 1-hexene, 1-heptene, 1-octene, 1-nonene, 1-decease, and 4-methyl-1-pentene. In an embodiment, the alpha-olefin comonomers can be selected from the group consisting of propylene, 1-butene, 1-hexene, and 1-octene. In other embodiments, the alpha-olefin comonomers can be selected from the group consisting of 1-hexene and 1-octene.

The first component of the bimodal HDPE can have a density in the range of from 0.915 to 0.940 g/cm$^3$, from 0.920 to 0.940 g/cm$^3$, or from 0.921 to 0.936 g/cm$^3$. The first component can have a melt index, $I_2$ (190° C./2.16 kg), in the range of from 0.5 to 10 g/10 min., from 1 to 7 g/10 min., or from 1.3 to 5 g/10 min. The first component can have a molecular weight in the range of from 150,000 to 375,000 g/mol, from 175,000 to 375,000 g/mol, or from 200,000 to 375,000 g/mol.

The second polymeric component of the bimodal HDPE can be an ethylene-based polymer; for example, the second component can be a low-molecular-weight ethylene homopolymer. The ethylene homopolymer may contain trace amounts of contaminate comonomers, for example alpha-olefin comonomers. In various embodiments, the second component can comprise less than 1 wt % of one or more alpha-olefin comonomers, based on the weight of the second component. For example, the second component may comprise from 0.0001 to 1.00 wt % of one or more alpha-olefin comonomers, or from 0.001 to 1.00 percent by weight of one or more alpha-olefin comonomers. The second component can comprise at least 99 wt % of ethylene, or in the range of from 99.5 to 100 wt % of ethylene, based on the weight of the second component.

The second component of the bimodal HDPE can have a density in the range of from 0.965 to 0.980 g/cm$^3$, or from 0.970 to 0.975 g/cm$^3$. The second component can have a melt index ($I_2$) in the range of from 50 to 1,500 g/10 min., from 200 to 1,500 g/10 min., or from 500 to 1,500 g/10 min. The second component can have a molecular weight in the range of 12,000 to 40,000 g/mol, from 15,000 to 40,000 g/mol, or from 20,000 to 40,000 g/mol.

Preparation methods for bimodal HDPE are well known in the art. Any method known or hereafter discovered for preparing a bimodal HDPE having the desired properties may be employed for making the bimodal HDPE. A suitable preparation method for making bimodal HDPE can be found, for example, in U.S. Patent Application Publication No. 2009-0068429, paragraphs [0063] to [0086].

An example of a commercially available bimodal HDPE is, but is not limited to, DMDA-1250NT, available from The Dow Chemical Company, Midland, Mich., USA.

Low Density Polyethylene (LDPE)

The LDPE resins are well known in the art, commercially available, and made by any one of a wide variety of processes including, but not limited to, solution, gas or slurry phase; Ziegler-Natta, metallocene or constrained geometry catalyzed (CGC); etc. These resins can have a density ranging from 0.91 to 0.94 g/cm$^3$. In various embodiments, the LDPE can have a density of at least 0.915 g/cm$^3$, but less than 0.94 g/cm$^3$, or less than 0.93 g/cm$^3$, or in the range of from 0.920 to 0.925 g/cm$^3$. Polymer densities provided herein are determined according to ASTM D792. LDPE suitable for use can have a melt index, I$_2$(190° C./2.16 kg), of less than 20 g/10 min, or ranging from 0.1 to 10 g/10 min., from 2 to 8 g/10min., from 4 to 8 g/10 min., or have an I$_2$ of about 6 g/10 min. Melt indices provided herein are determined according to ASTM method D1238. Generally, LDPE have a broad molecular weight distribution ("MWD") resulting in a relatively high polydispersity index ("PDI;" ratio of weight-average molecular weight to number-average molecular weight). LDPE can have a polydispersity index ("PDI") in the range of from 1.0 to 30.0, or in the range from 2.0 to 15.0, as determined by gel permeation chromatography.

Commercially available LDPE resins include but are not limited to DOW Low Density Polyethylene resins, e.g., AXELERON™ CX B-1258 NT, available from The Dow Chemical Company and, in general, any fractional melt flow index (MFI) resin for use in heavy duty bags or agricultural films such as those available from Borealis, Basel, Sabic and others.

Specific examples of LDPE useful in this invention include homogeneously branched, linear ethylene/alpha-olefin copolymers (e.g. TAFMER™ by Mitsui Petrochemicals Company Limited and EXACT™ by Exxon Chemical Company), homogeneously branched, substantially linear ethylene/alpha-olefin polymers (e.g., AFFINITY™ and ENGAGE™0 polyethylene available from The Dow Chemical Company), and olefin block copolymers such as those described in U.S. Pat. No. 7,355,089 (e.g., INFUSE™ available from The Dow Chemical Company). The more preferred LDPE are the homogeneously branched linear and substantially linear ethylene copolymers. The substantially linear ethylene copolymers are especially preferred and are more fully described in U.S. Pat. Nos. 5,272,236, 5,278,272 and 5,986,028.

HDPE/LDPE Blend

The blend of HDPE/LDPE typically comprises, in weight percent (wt %) based on the weight of the blend, greater than 50, or 60, or 70, 80, 85 percent HDPE with the remainder of the blend comprising LDPE. Typically, the HDPE/LDPE blend does not comprise in excess of 98, or 95, or 90, weight percent HDPE with the remainder of the blend comprising the LDPE.

In one embodiment the blend of HDPE/LDPE consists of, or consists essentially of, HDPE and LDPE, i.e., it does not contain any compound other than HDPE and LDPE that is essential to its operability. In one embodiment the blend of HDPE/LDPE comprises one or more other polymers. In one embodiment the one or more other polymers is a polyolefin. In one embodiment the one or more other polymers is a polyolefin elastomer. In one embodiment the one or more other polymers is polypropylene (PP) examples of which include, but are not limited to, Pro-fax RP323M, Pro-fax EP315J, and Moplen RP220M all available from Lyondell-Basell Industries; homopolymer polypropylene H509 from Braskem; and YUPLENE H730F from SK Global Chemical. If present, these other polymers are present in amounts of less than (<) 50 wt %, or <30, or <25, or <20, <15, <10, <5 or <2, wt % based on the weight of the blend.

Nucleating Agent

Polytetrafluoroethylene (PTFE)

Any known or hereafter discovered fluororesin can be employed herein. Examples of suitable fluororesins include, but are not limited to, polytetrafluoroethylene ("PTFE"), tetrafluoroethylene-perfluoroalkyl vinyl ether copolymer ("PFA"), ethylene-tetrafluoroethylene copolymer ("ETFE"), tetrafluoroethylene-hexafluoropropylene copolymer ("FEP"), tetrafluoroethylene-ethylene copolymer, polyvinylidene fluoride ("PVdF"), polychlorotrifluoroethylene ("PCTFE"), chlorotrifluoroethylene-ethylene copolymer ("ECTFE") and the like, with preference given to PTFE, PFA and ETFE. In one or more embodiments, the fluororesin comprises PTFE. In one or more embodiments, the fluororesin consists of PTFE.

Fluororesin particles, particularly those of less than a micron in size, tend to agglomerate. Some commercially available fluororesin powders comprise a high concentration of agglomerates of at least 5 microns (μm) in size, e.g., diameter. Typically the size of the agglomerates range from 4 to 50 microns, more typically from 5 to 20 microns and even more typically from 5 to 15 microns. Typically, the amount of fluororesin agglomerates of at least 5 μm in size in these powders is at least 80%, more typically at least 82%, and even more typically at least 85%. These powders do not disperse well in many polyolefins, e.g., HDPE and/or LDPE.

While agglomerated fluororesin particles, i.e., agglomerates, as described above can be used in the practice of this invention, in one embodiment unagglomerated particles are used. In one embodiment the fluororesin components of the nucleators used in this invention are unagglomerated particles of less than a micron in size, or less than 0.5 micron in size, or less than 0.3 micron in size, which may be commingled with agglomerates that were either originally submicron in size or were reduced in size from greater than a micron to less than a micron. In one embodiment the fluororesin component of the nucleator used in the practice of the invention comprises less than 10 wt %, or 9 wt %, or 8 wt %, or 7 wt %, or 6 wt %, or 5 wt %, or 4 wt %, or 3 wt %, or 2 wt %, or 1 wt % of agglomerates greater than a micron in size, but the smaller the amount of such agglomerates, and thus the greater the amount of submicron particles and submicron agglomerates, the better the dispersion of the fluororesin in the polyolefin, and the more evenly distributed are the cell sizes in the foamed product.

Agglomerated particles can be separated from one another by any conventional means, e.g., grinding, mixing or stirring (typically at a relatively high speed), etc. In one embodiment a fluororesin comprising agglomerates of one micron or greater, typically of 3, or 4, or 5 microns or greater, is subjected to any procedure, treatment, etc. that will reduce the majority, preferably 60%, 70%, 80%, 90% or more, of the such agglomerates to either unagglomerated particles of less than a micron in size, or agglomerates of less than a micron in size before the nucleator is mixed with the polyolefin.

In one embodiment the fluororesin component of the nucleator used in the practice of this invention and comprising agglomerates of one micron or greater, typically of 3, or 4, or 5 microns or greater, is first mixed with the polyolefin, with or without the expandable polymeric microspheres component of the nucleator, to form a masterbatch, and then the masterbatch is subjected to any procedure, treatment, etc. that will reduce the majority, preferably 60%, 70%, 80%, 90% or more, of the such agglomerates to either unagglomerated particles of less than a micron in size, or agglomerates of less than a micron in size. Typically the masterbatch comprises from 1 to 50, more typically from 5 to 50 and even more typically from 15 to 30 weight percent (wt %) fluororesin, and from 50 to 99, more typically from 60 to 95 and even more typically from 70 to 85 wt % polyolefin. After the masterbatch is subjected to the fluororesin size reduction procedure, treatment, etc., the masterbatch is mixed with the expandable polymeric microspheres component of the nucleator (if it does not already comprise that component) and the polyolefin to be foamed under conditions and for a sufficient period of time to uniformly disperse the unagglomerated particles and agglomerates within the polyolefin before the start of the foaming process.

In one embodiment the fluororesin comprising agglomerates of one micron or greater, typically of 3, or 4, or 5 microns or greater, is first mixed with the polyolefin, with or without the expandable polymeric microspheres component of the nucleator, in the amount desired for the practice of the foaming process, and then the polyolefin is subjected to any procedure, treatment, etc. for a sufficient amount of time that will both (1) reduce the majority, preferably 60%, 70%, 80%, 90% or more, of the such agglomerates to either unagglomerated particles of less than a micron in size, or agglomerates of less than a micron in size, and (2) substantially uniformly disperse these unagglomerated particles and reduced agglomerates within the polyolefin before the foaming process commences. The expandable polymeric microspheres component of the nucleator can be added to the polyolefin before, simultaneously with, or after the addition of the fluororesin, and before or after the agglomerates of the fluororesin are subjected to size reduction.

The nucleator, preferably PTFE comprising particles and agglomerates of less than a micron in size, can be added to the polyolefin composition comprising or consisting essentially of HDPE and LDPE, by any conventional means. The nucleator can be added neat, in combination with one or more other additives, e.g., antioxidant, cell stabilizer, etc., or as part of a masterbatch. The nucleator is mixed with the polyolefin composition to achieve an essentially homogeneous dispersion of nucleator in the polyolefin composition and to this end, batch mixing, e.g., through the use of a BUSS™ kneader, is typically preferred to mixing in an extruder. If the nucleator is first mixed with the polyolefin composition in an extruder, then it is typically added to the polyolefin composition prior to injection of the gas for foaming.

Particle size can be determined by any method known in the art. In one embodiment, the determination of particle size and proportion (% by number) of fluororesin powder can be determined as follows. A dispersion comprising a fluororesin powder obtained by a dispersing treatment for about 2 minutes under ultra-sonication of about 35-40 kHz and ethanol, wherein the fluororesin powder is contained in an amount to make a laser permeation (proportion of output light to incident light) of the dispersion 70-95%, is subjected to a microtrack particle size analyzer under relative refraction (determination is done based on the ratio of diffraction ratio (about 0.99) of fluororesin powder to that of ethanol or according to the measure of the above-mentioned particle size analyzer which is the nearest to the ratio (e.g., 1.02)) and flow type cell measurement mode to determine particle size ($D_1$, $D_2$, $D_3$ . . .) of individual particles and the number ($N_1$, $N_2$, $N_3$ . . .) of particles having each particle size based on the optical diffraction of the laser. In this case, the particle size (D) of individual particles is automatically measured by the microtrack particle size analyzer wherein particles having various shapes are measured in terms of the diameters of the corresponding spheres. Therefore, the proportion (% by number) of the particle size $D_1$ is expressed by the percentage of the number of these particles ($N_1$) to the number of the entire particles ($\Sigma N$). The proportion of the particles having a particle size of 0.1-0.5 μm is expressed by the percentage of the number of the particles having a particle size of 0.1-0.5 . μm to the total number of the existing particles ($\Sigma N$). Similarly, the proportion of the particles having a particle size of not less than 5 μm is expressed by the percentage of the number of the particles having a particle size of not less than 5 μm to the total number of the existing particles ($\Sigma N$). On the other hand, the average particle size of the nucleator of the present invention can be calculated using the total number of existing particles ($\Sigma N$) and the total of the product of the cube of the particle size of respective particles and the total number of existing particles ($\Sigma ND^3$), according to the following formula Average Particle Size (μm)=$(\Sigma ND^3/\Sigma N)^{1/3}$ Calculation of particle size is further illustrated in U.S. Pat. No. 6,121,335. The calculation of agglomerate size is determined in the same manner as that described above for particle size determination.

While the shape of the fluororesin particles and agglomerates is not particularly limited, it is preferable that the particles and agglomerates are primarily sphere-like in shape to produce a foam comprising fine cells and superior in uniform foaming.

Expandable Polymeric Microspheres

Expandable polymeric microspheres are adapted to expand dramatically when exposed to heat as described in U.S. Pat. No. 3,615,972. These microspheres are monocellular particles comprising a body of resinous material encapsulating a volatile fluid. When heated, the resinous material of thermoplastic microspheres softens and the volatile material expands—causing the entire microsphere to increase substantially in size. On cooling, the resinous material in the shell of the microspheres ceases flowing and tends to retain its enlarged dimension; the volatile fluid inside the microsphere tends to condense, causing a reduced pressure in the microsphere.

Typically, expandable polymeric microspheres are made of a thermoplastic polymer shell e.g. methyl methacrylate and acrylonitrile, methyl methacrylate, acrylonitrile and vinylidene chloride, o-chlorostyrene, p-tertiarybutyl styrene, vinyl acetate and their copolymers, i.e., styrene-methacrylic acid, styrene-acrylonitrile, styrene-methyl methacrylate The gas inside the shell can be an aliphatic hydrocarbon gas, e.g. isobutene, pentane, or iso-octane. These microspheres may be obtained in a variety of sizes and forms, with expansion temperatures generally ranging from 80 to 130° C. Expandable polymeric microspheres are commercially available, for example, from Akzo Nobel under the trademark EXPANCEL™, and from Henkel under the trademark DUALITE™. The term "expandable microsphere" as used in this disclosure is intended to encompass any hollow resilient container filled with volatile fluid which is adapted to expand. The microspheres are typically ball-shaped particles but may have other shapes as well, e.g., tubes, ellipsoids, cubes, particles and the like, all adapted to expand when exposed to an energy source.

Fluororesin/Microsphere Mixture

The weight ratio of expandable polymeric microsphere to fluororesin, preferably PTFE, is typically from 20:80 to 70:30 and even more typically from 20:80 to 50:50. Expressed as the amount of fluororesin and microsphere added to the polyolefin composition, sufficient fluororesin is added to the polyolefin composition to result in the fluororesin typically comprising from 0.01 to 1 wt %, more typically from 0.05 to 0.6 wt % and even more typically from 0.1 to 0.3 wt % of the polyolefin composition. Sufficient expandable polymeric microspheres are added to the polyolefin composition to result in the fluororesin typically comprising from 300 parts per million (ppm) to 5,000 ppm, more typically from 500 ppm to 5,000 ppm and even more typically from 500 ppm to 3,000 ppm of the polyolefin composition.

The amount of the nucleator of this embodiment, i.e., fluororesin and expandable polymeric microspheres, that is added to the polyolefin composition is typically from 0.01 to 1 wt %, more typically from 0.05 to 0.6 wt % and even more typically from 0.1 to 0.3 wt % based on the weight of the polyolefin composition. The manner of mixing the nucleator of this embodiment with the polyolefin composition is also as described above.

The use of the fluororesin/microsphere nucleator of this embodiment produces a higher performance product as compared to a product produced using a fluororesin, particularly PTFE, alone as the nucleator as well as to a product produced using expandable polymeric microspheres alone as the nucleator The products exhibit enhanced properties in terms of expansion ratio, cell size, cell density and cell size uniformity as well as surface smoothness. In this hybrid nucleating agent, the fluororesin is the "passive" nucleating agent and expandable polymeric microspheres are the "active" nucleating agent. The synergistic effect between these two nucleating agents results in a higher nuclei density and smaller cell size as compared to processes using and products produced by the use of neat PTFE or neat microspheres alone as the nucleating agent.

Additives

Antioxidants

In one embodiment the compositions of this invention include one or more antioxidants. Examples of antioxidants include, but are not limited to, hindered phenols such as tetrakis[methylene(3,5-di-tert-butyl-4-hydroxyhydro-cinnamate)]methane; bis[beta-(3, 5-ditert-butyl-4-hydroxybenzyl)-methylcarboxyethyl)]sulphide; 4,4'-thiobis(2-methyl-6-tert-butyl-phenol); 4,4'-thiobis(2-tert-butyl-5-methylphenol); 2,2'-thiobis(4-methyl-6-tert-butylphenol); and thiodiethylene bis(3,5-di-tert-butyl-4-hydroxy)hydro-cinnamate; phosphites and phosphorites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydro-quinoline; n,n'-bis(1,4-dimethylpentyl-p-phenylenediamine); alkylated diphenylamines; 4,4'-bis(alpha, alpha-dimethylbenzyl)diphenylamine; diphenyl-p-phenylenediamine, mixed di-aryl-p-phenylenediamines, and other hindered amine anti-degradants or stabilizers. Antioxidants can be used, for example, in amounts of 0.01 to 5 wt %, or from 0.01 to 0.1 wt %, or from 0.01 to 0.3 wt %, based on the weight of the composition.

Cell Stabilizers

In one embodiment the compositions of this invention include one or more cell stabilizers. Examples of cell stabilizers include, but are not limited to, glycerol monostearate (GMS), glycerol monopalmitate (GMP), palmitides and/or amides. Suitable amides include, but are not limited to, stearyl stearamide, palmitides and/or stearamide. Suitable mixtures include, but are not limited to, a mixture of GMS and GMP, or a mixture comprising stearamide and palmitamide. Cell stabilizers can be used, for example, in amounts of 0.01 to 5 wt %, or from 0.01 to 0.1 wt %, or from 0.01 to 0.3 wt %, based on the weight of the composition.

Other Additives

The polyolefin composition used in this invention may contain one or more other additives as necessary or desired. Representative of these other additives include, but are not limited to, processing aids, lubricants, foaming aids, surfactants, flow aids, viscosity control agents, coloring agents, metal inhibitors and the like. These additives can be added to the polymer(s) either before or during processing. The amount of any particular additive in the polyolefin composition is typically from 0.01 to 1 wt %, more typically from 0.01 to 0.5 wt % and even more typically from 0.01 to 0.3 wt %, and the total amount of these other additives in the polyolefin composition, if present at all, is typically from 0.01 to 5 wt %, more typically from 0.01 to 2 wt % and even more typically from 0.01 to 1 wt %.

Compounding

Compounding of the blended compositions of this invention can be performed by standard means known to those skilled in the art. Examples of compounding equipment are internal batch mixers, such as a BANBURY™ or BOLLING™ internal mixers. Alternatively, continuous single or twin screw mixers can be used, such as a FARREL™ continuous mixer, a WERNER and PFLEIDERER™ twin screw mixer, or a BUSS™ kneading continuous extruder. The type of mixer utilized, and the operating conditions of the mixer, can affect properties of the composition such as viscosity, volume resistivity, and extruded surface smoothness.

The compounding temperature for the blends of this invention is typically from the melting point of the lowest melting polymer of the blend, e.g., 100° C., to 140° C., more typically from 105 to 120° C. The various components of the final composition can be added to and compounded with one another in any order, or simultaneously, but typically the HDPE and LDPE are first compounded with one another and then the nucleating agent and additives are added either one before the other or simultaneously. Alternatively, the nucleating agent and/or additives are first formulated into a masterbatch with either or both of the HDPE and LDPE as the carrier resin, and then the masterbatch is added to the HDPE/LDPE blend.

Masterbatches

In one embodiment the invention is a masterbatch comprising one or more of HDPE and LDPE as the carrier resin and a mixture of fluororesin, particularly PTFE, and expandable polymeric microspheres as the nucleating agent. In one embodiment the invention is a masterbatch comprising in weight percent based on the weight of the masterbatch:

(A') 50 to 95 wt % of at least one of HDPE and LDPE, and (C) 5 to 50 wt % of a nucleating agent comprising in weight percent based on the weight of the nucleating agent:

(1) 20 to 80 wt % of PTFE, and
(2) 80 to 20 wt % of expandable polymeric microspheres.

In one embodiment the carrier resin of the masterbatch is HDPE. In one embodiment the carrier resin is LDPE. In one embodiment the carrier resin is a combination of HDPE and LDPE.

Foaming Agent

The foaming agent is one or more suitable for the extrusion temperature, foaming conditions, foam forming method and the like. When an insulating foam layer in the final form is to be formed simultaneously with extrusion forming, for example, an inert gas such as nitrogen, a carbon gas (e.g., CO, $CO_2$, etc.), helium, argon and the like, hydrocarbon such as methane, propane, butane, pentane and the like, halogenated hydrocarbons such as dichlorodifluoromethane, dichloromonofluoromethane, monochlorodifluoromethane, trichloromonofluoromethane, monochloropentafluoroethane, trichlorotrifluoroethane and the like are used. The amount of the foaming agent to be used can vary. Typically, it is 0.001-0.1 part by weight, more typically 0.005-0.05 part by weight, per 100 parts by weight of the polyolefin composition to be foamed. The foaming agent may be mixed with an organic polymer to be foamed in advance or may be supplied into an extruder from a foaming agent supply opening formed on the barrel of the extruder.

Foaming Process

The polyolefin composition of this invention is foamed using known methods and known equipment. Typically, a foam is produced by extruding the polyolefin composition containing a nucleator using an extruder operated under foaming extrusion conditions, e.g., injection of a foaming agent while the composition is in a high pressure zone and then extruding the composition to a low pressure zone. Foaming process are further described by C. P. Park in *Polyolefin Foam*, Chapter 9, *Handbook of Polymer Foams and Technology*, edited by D. Klempner and K. C. Frisch, Hanser Publishers (1991).

In one embodiment, a typical extrusion foaming process uses an atmospheric gas (e.g., $CO_2$) to produce a foamed cable insulation as described in CA 2 523 861 C, *Low Loss Foam Composition and Cable Having Low Loss Foam Layer*. Dissolution of the foaming gas into the polymer melt is governed by Henry's law as reported for example in the work of H. Zhang (below) and others. Solubility is a function of the saturation pressure and the Henry's law constant, which itself is a function of temperature. /Zhang_Hongtao_201011 MASc_thesis.pdf. Also see *Foam Extrusion: Principles and Practice* by Shau-Tarng Lee, editor. The MuCell® microcellular foam injection molding technology is an example of a commercially practiced foaming process, and it is described generally in U.S. Pat. No. 6,284,810.

Given the above on the importance of adequate pressure control during foaming extrusion, a suitable process would be the one commercially referred to as the MuCell process, in which adequate pressures are built via specific hardware design, for effective nucleation as reported in U.S. Pat. No. 684,810. The method disclosed in this publication relies solely on high pressure drops (dP/dt) for self-nucleation of the foaming gas in the absence of an "auxiliary nucleating agent" (Col. 4, line 25-30).

In one embodiment the invention is a process of coating a wire or cable with a foamable polyethylene composition, the process comprising the steps of:
(1) preparing in an extrusion zone a melt blend of (a) HDPE, (b) LDPE, and (c) a nucleating agent comprising in weight percent based on the weight of the nucleating agent:
   (i) 20 to 80 wt % of PTFE, and
   (ii) 80 to 20 wt % of expandable polymeric microspheres, and
(2) extruding the mixture of (1) under extrusion conditions onto a wire or cable.

In one embodiment the HDPE, LDPE and nucleating agent are fed to an extrusion zone as a pre-compounded blend, e.g., as a pellet. In one embodiment the HDPE, LDPE and nucleating agent are fed to an extrusion zone as a masterbatch. In one embodiment the HDPE and LDPE are first melt blended with one another, and then the nucleating agent is added to the melt blend. In one embodiment the HDPE, LDPE and nucleating agent, and any optional additives, are pre-compounded to form a blend, preferably a homogeneous blend, and the blend is then fed to a foaming extrusion zone, e.g., a foaming extruder.

The following examples are illustrative of certain embodiments of the invention.

EXAMPLES

Materials

The materials used in these examples are described in Table 1.

TABLE 1

Example Materials

| Chemicals | Function | Supplier | Product specification |
|---|---|---|---|
| AXELERON ™ CX A-6944NT | base resin for foaming | Dow | MI (190° C./2.16 kg): 8.0 g/10 min; density: 0.965 g/cc |
| AXELERON ™ CX B-1258 NT | base resin for foaming or nucleator masterbatch carrier | Dow | MI (190° C./2.16 kg): 6 g/10 min; density: 0.922 g/cc |
| 950DU80 | Nucleator | Akzo Nobel. | EXPANCEL ™, particle size D50: 18~24 μm, Temperature onset decomposition: 138~148° C., Tmax: 188~200° C. |
| 930DU120 | Nucleator | Akzo Nobel. | EXPANCEL ™, particle size D50: 28~38 μm, Temperature onset decomposition: 122~132° C., Tmax: 191~204° C. |
| MP1400 | Nucleator | DuPont | PTFE, D50: 10 um |
| Polymist F5A | Nucleator | Solvay | PTFE, D50: 4 um |

Foaming Process

The physical foaming experiment was conducted on the single-screw extruder with gas injection system. The screw diameter is 50 mm with L/D ratio of 40. The gas injection point is located at the middle of screw with $CO_2$ as blowing agent. The temperature profile is 140/175/180(gas injection)/170/145(static mixer)/143(die). The HDPE, LDPE and nucleating agent MB are dry blended first then fed on the upstream of the extruder. Alternatively, AXELERON™ CX A-6944NT, AXELERON™ CX B-1258NT and nucleating agent masterbatch are compounded into "all in one" formulation then foamed on the gas injected extruder.

Characterization of Extruded Foam Rod

Porosity

The expansion ratio was calculated based on the density of sample before and after foaming. The density of foamed article and solid plaque were measured according to ASTM D792.

$$\text{Porosity} = (1 - \rho_{foam}/\rho_{solid}) * 100\%$$

Average Cell Size (D)

The obtained PE foam sample was fractured utilizing liquid nitrogen and then coated by IR Scanning Electron Microscopy (SEM) images were obtained with different magnification. The average cell size was obtained through the analysis of the SEM photographs.

The cell density in the foamed article can be calculated by the following Equation:

$$N_f \left( \frac{n_c M_c^2}{A_c} \right)^{3/2}$$

$N_f$, represents cell number per cubic centimeter volume in the foamed article, $n_c$ is the cell number in the view area of SEM picture. $A_c$ is the area of SEM picture and $M_c$ is the magnification. D, which is the average the cell size, can be calculated by the following Equation:

$$D = \left( \frac{6V_c^2}{\pi N_f} \right)^{1/3}$$

where, $V_c$ represents that expansion ratio of foamed article.

Table 2 reports the results of Comparative Examples 1-7 and Inventive Examples 1-4.

TABLE 2

Foaming Performance of Various Nucleating Agents

| Label | CE-1 | CE-2 | CE-3 | CE-4 | CE-5 | CE-6 | CE-7 | IE-1 | IE-2 | IE-3 | IE-4 |
|---|---|---|---|---|---|---|---|---|---|---|---|
| AXELERON ™ CX A-6944NT | 70 | 70 | 70 | 70 | 70 | 70 | 70 | 70 | 70 | 70 | 70 |
| AXELERON ™ CX B-1258NT | 29.85 | 29.7 | 29.5 | 29.85 | 29.7 | 29.5 | 29.5 | 29.5 | 29.5 | 29.5 | 29.5 |
| MP1400, PTFE | 0.15 | 0.3 | 0.5 | | | | 0.1 | 0.4 | 0.25 | 0.2 | 0.15 |
| Expancel 950DU80 | | | | 0.15 | 0.3 | 0.5 | 0.4 | 0.1 | 0.25 | 0.3 | 0.35 |
| Total | 100 | 100 | 100 | 100 | 100 | 100 | 100 | 100 | 100 | 100 | 100 |
| Avg. Cell Size, um | 253 | 225 | 230 | 462 | 445 | 246 | 245 | 208 | 218 | 217 | 233 |
| Porosity, % | 79.1 | 78.5 | 79.2 | 77.8 | 78.1 | 77.9 | 77.6 | 78.3 | 78.2 | 78.6 | 79.6 |
| cell density (N/cm3) | 4.81E+04 | 6.34E+04 | 8.27E+04 | 1.28E+04 | 1.45E+04 | 3.95E+04 | 6.41E+04 | 9.98E+04 | 8.31E+04 | 8.65E+04 | 8.36E+04 |

The experimental results show that combination of PTFE with EXPANCEL™ had better foaming performance, e.g. finer cell size and smoother surface, than neat PTFE as well as EXPANCEL™ alone. The synergistic effect between PTFE and EXPANCEL™ on the foaming can be observed when the ratio of PTFE to EXPANCEL™ is from 30/70 to 80/20.

Table 3 reports the results of Comparative Examples 8-13 and Inventive Examples 5-10.

TABLE 3

Foaming Performance of Various Nucleating Agents

| | Proposed Additional Runs | | | | | |
|---|---|---|---|---|---|---|
| Label | CE-8 | CE-9 | CE-10 | CE-11 | CE-12 | CE-13 |
| AXELERON ™ CX A-6944NT | 70 | 70 | 70 | 70 | 50 | 90 |
| AXELERON ™ CX B-1258NT | 29.5 | 29.5 | 29 | 29 | 49.5 | 9.5 |
| MP1400 | | | 1 | | 0.5 | 0.5 |
| Polymist F5A | 0.5 | | | | | |

TABLE 3-continued

Foaming Performance of Various Nucleating Agents

|  |  |  |  |  |  |  |
|---|---|---|---|---|---|---|
| Expancel 950DU80 |  |  |  |  | 1 |  |
| Expancel 930DU120 |  | 0.5 |  |  |  |  |
| Total | 100 | 100 | 100 | 100 | 100 | 100 |
| Avg. Cell Size, um | 226.1 | 245.7 | 186.3 | 204.6 | 126.3 | 110.3 |
| Porosity, % | 78.8 | 74.5 | 73.8 | 75.0 | 33.1 | 39.6 |
| cell density (N/cm3) | 8.61E+04 | 3.84E+04 | 1.09E+05 | 6.77E+04 | 7.79E+04 | 8.12E+04 |

Proposed Additional Runs

| Label | IE-5 | IE-6 | IE-7 | IE-8 | IE-9 | IE-10 |
|---|---|---|---|---|---|---|
| AXELERON ™ CX A-6944NT | 70 | 70 | 70 | 50 | 70 | 90 |
| AXELERON ™ CX B-1258NT | 29.5 | 29.5 | 29 | 49.5 | 29.85 | 9.5 |
| MP1400 |  | 0.4 | 0.8 | 0.4 | 0.12 | 0.4 |
| Polymist F5A | 0.4 |  |  |  |  |  |
| Expancel 950DU80 | 0.1 |  | 0.2 | 0.1 | 0.03 | 0.1 |
| Expancel 930DU120 |  | 0.1 |  |  |  |  |
| Total | 100 | 100 | 100 | 100 | 100 | 100 |
| Avg. Cell Size, um | 191.5 | 211.1 | 182.3 | 70.6 | 260.7 | 94.1 |
| Porosity, % | 78.1 | 73.7 | 79.6 | 55.9 | 81.3 | 28.2 |
| cell density (N/cm3) | 1.08E+05 | 9.33E+04 | 1.14E+05 | 1.05E+05 | 3.89E+04 | 8.44E+04 |

The experimental show that combination of different grade of PTFE with different grade of EXPANCEL™ had better foaming performance, e.g. finer cell size and high cell density, than neat PTFE as well as EXPANCEL™. The synergistic effect between PTFE and EXPANCEL™ with different grades on the foaming can be observed.

The synergistic effect between PTFE and EXPANCEL™ on the foaming can be observed when total loading of nucleating agent is up to 1%.

The experimental show that combination of PTFE with EXPANCEL™ had better foaming performance, e.g. finer cell size and high cell density, than neat EXPANCEL™.when total loading of nucleating agent is lower than 0.15%.

The synergistic effect between PTFE and EXPANCEL™ on the foaming can be observed with a broad HDPE/LDPE ratio from 90/10 to 50/50.

The invention claimed is:

1. A composition comprising in weight percent based on the weight of the composition:
   (A) 45 to 95 wt % HDPE,
   (B) 4 to 54 wt % LDPE, and
   (C) 0.01 to 2 wt % of a nucleating agent comprising in weight percent based on the weight of the nucleating agent:
     (1) 20 to 80 wt % of fluororesin, and
     (2) 80 to 20 wt % of expandable polymeric microspheres.

2. The composition of claim 1 in which the fluororesin comprises one of polytetrafluoroethylene ("PTFE"), tetrafluoroethylene-perfluoroalkyl vinyl ether copolymer ("PFA"), or ethylene-tetrafluoroethylene copolymer ("ETFE").

3. The composition of claim 1 in which the HDPE is bimodal.

4. The composition of claim 1 further comprising at least one of an antioxidant and a cell stabilizer.

5. A masterbatch comprising in weight percent based on the weight of the masterbatch:
   (A') 50 to 95 wt % of at least one of HDPE and LDPE, and
   (C) 5 to 50 wt % of a nucleating agent comprising in weight percent based on the weight of the nucleating agent:
     (1) 20 to 80 wt % of a fluororesin, and
     (2) 80 to 20 wt % of expandable polymeric microspheres.

6. The masterbatch of claim 5 comprising both HDPE and LDPE.

7. The masterbatch of claim 5 in which the fluororesin comprises one of polytetrafluoroethylene ("PTFE"), tetrafluoroethylene-perfluoroalkyl vinyl ether copolymer ("PFA"), or ethylene-tetrafluoroethylene copolymer ("ETFE").

8. The masterbatch of claim 5 in which the HDPE is bimodal.

9. A process of coating a wire or cable with a foamable polyethylene composition, the process comprising the steps of:
   (1) preparing in an extrusion zone a melt blend of (a) HDPE, (b) LDPE, and (c) a nucleating agent comprising in weight percent based on the weight of the nucleating agent:
     (i) 20 to 80 wt % of fluororesin, and
     (ii) 80 to 20 wt % of expandable polymeric microspheres, and
   (2) extruding the mixture of (1) under extrusion conditions onto a wire or cable.

10. The process of claim 9 in which the fluororesin comprises one of polytetrafluoroethylene ("PTFE"), tetrafluoroethylene-perfluoroalkyl vinyl ether copolymer ("PFA"), or ethylene-tetrafluoroethylene copolymer ("ETFE").

11. The process of claim 9 in which the HDPE is bimodal.

12. The process of claim 9 in which the foamable composition further comprises one or more of an antioxidant and a cell stabilizer.

13. The process of claim 12 in which the HDPE, LDPE and nucleating agent are pre-compounded outside of the extrusion zone.

14. The process of claim 12 in which the nucleating agent is fed to the extrusion zone as part of a masterbatch.

15. The process of claim 12 in which the HDPE, LDPE and nucleating agent are fed to the extrusion zone as a pre-compounded pellet.

* * * * *